United States Patent Office 3,353,048
Patented Nov. 14, 1967

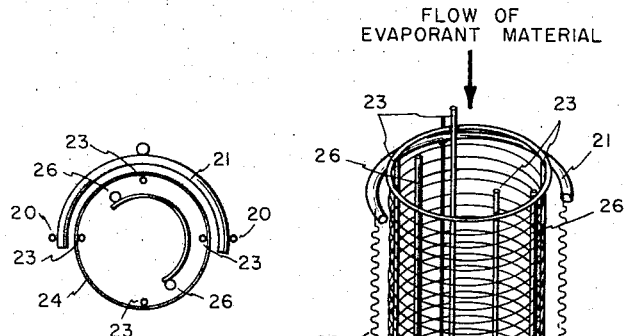
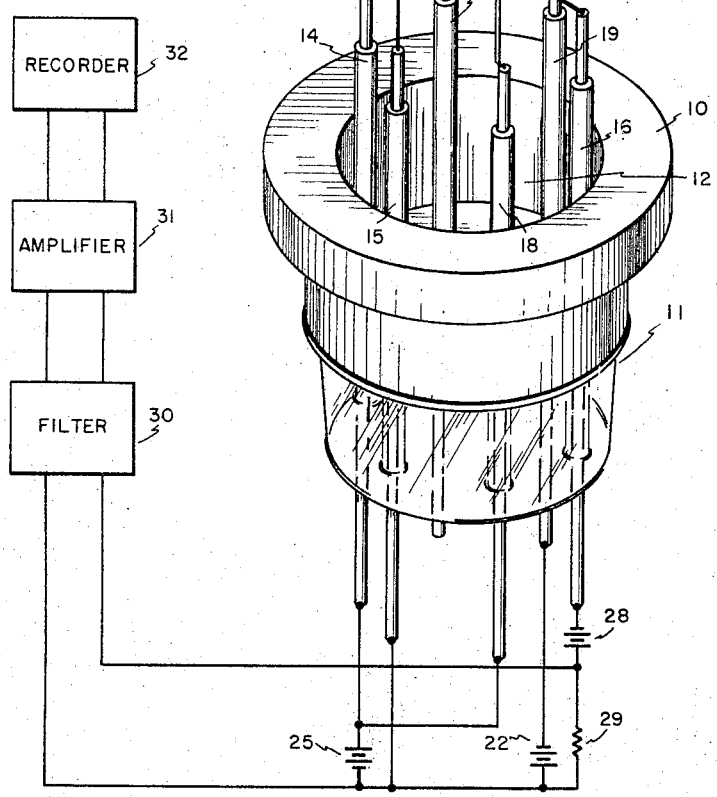

3,353,048
IONIZATION GAUGE FOR MONITORING THE FLOW OF EVAPORANT MATERIAL
Arno K. Hagenlocher, Kew Gardens, and Thomas G. Polanyi, Croton-on-Hudson, N.Y., assignors to General Telephone and Electronics Laboratories, Inc., a corporation of Delaware
Filed Nov. 23, 1964, Ser. No. 413,034
5 Claims. (Cl. 313—7)

This invention relates to apparatus for monitoring the rate of flow of evaporant material, such as the flow of materials being vacuum deposited on a substrate during the manufacture of electronic thin film devices.

Thin film devices are often made by the vacuum deposition of one or more materials on a suitable substrate to form a number of electronic circuit elements. The amount and composition of the material deposited on the substrate generally determines the electrical characteristics of the resultant device. The materials so deposited may be electrically conductive, such as nichrome, aluminum, gold, or copper alloys, or relatively non-conductive such as oxides of barium, titanium, tantalum, or silicon. The vaporization temperatures of these materials varies substantially and also the presence of different gas environments may be required during vacuum deposition. The monitoring or measurement of the rate of flow of evaporant material has heretofore been difficult to attain because of the different dynamic conditions present during measurement.

Accordingly, it has been proposed to use an ionization gauge in the measurement of the flow of evaporant material in vacuum deposition processes. As known in the art, an ionization gauge employs a cathode, a positively charged grid arranged to accelerate and collect electrons emitted from the cathode, and a negatively charged collector electrode disposed within the stream of the evaporant material and arranged to collect positively charged ions generated by the impact of the accelerated electrons with the molecules of the evaporant material. This technique is described in an article, entitled, "Method of Measuring and Controlling Evaporation Rates During Production of Thin Films in Vacuum," by H. Schwartz in the Review of Scientific Instruments, vol. 32, p. 194 (1961).

In practice, the electrons emitted from the cathode collide with not only the molecules of the evaporant material, but also with the molecules of gas present as either background pressure or as part of a controlled gaseous environment. The ionization current contains two components. It has been found that periodically terminating or interrupting the flow of evaporant material provides an ionization current having a D.C. component resulting from the background pressure and an A.C. component due to the periodic flow of evaporant material. Subsequent filtering enables both signals to be separated and used independently.

However, the prior art ionization gauges have been found to have several disadvantages. If the collector is disposed within the beam of evaporant material, satisfactory monitoring of a flow of electrically non-conductive material has been generally unattainable. After a relatively short period of operation, the evaporant material deposits on the collector electrode rendering the gauge insensitive. If the collector is heated to a temperature sufficient to prevent the non-conductive material from depositing thereon, electron emission from the collector is found to result in inaccurate monitoring.

In the monitoring of the flow of conductive evaporant material, the deposition of the conductive material on the collector has been found to change the characteristics of the gauge with time. Also, the deposition of conductive material on the gauge envelope and electrical connectors has been found to cause leakage currents between the cathode, grid and collector which result in a degradation of the gauge sensitivity.

It is therefore an object of the present invention to provide an improved ionization gauge for monitoring the flow of both conductive and non-conductive evaporant material.

Another object of the invention is to provide an ionization gauge for monitoring the flow of evaporant material which substantially eliminates leakage currents arising from the deposition of evaporant material therein.

A further object of the invention is the provision of an ionization gauge wherein the need for collector heating is obviated.

Still another object is the provision of an ionization gauge having an improved substantially constant sensitivity.

In accordance with the teachings of the present invention, an ionization gauge is constructed having a plurality of ion collectors, a helically-wound accelerating grid and a cathode element. The stream of evaporant material to be measured is directed to flow axially through the volume defined by the accelerating grid. A cathode, positioned outside the grid, emits electrons which are accelerated by the grid and pass through the spaces between adjacent windings to enter the grid volume.

The electrons entering the grid volume collide with and ionize the molecules of evaporant material and gas therein. The positive ions are collected by a plurality of ion collectors positioned within the grid volume and spaced from the stream of evaporant material. By spacing the collectors outside the stream of evaporant material, there is substantially no deposition of material thereon and consequently the sensitivity of the gauge is maintained essentially constant. It has been found that employing two ion collectors outside the stream of evaporant material results in an ionization gauge having the same order of sensitivity as that found in ionization gauges wherein the collector is disposed within the flow path. If additional ion collectors are positioned outside the stream and within the grid volume, the gauge sensitivity is increased.

The cathode, grid, and collector electrodes are supported above an insulating base member having a centrally located passage therein. The electrical connectors for the electrodes are covered with a suitable insulating shield, such as glass, and are fed through the base member passage. The base member is mounted on a glass envelope with the electrical connectors being fed through the envelope to form a conventional external mounting pin connection. This construction eliminates leakage currents due to the deposition of the evaporation material on the envelope and the collectors.

Further features and advantages of the present invention will be more readily apparent from the following detailed description when viewed in conjunction with the accompanying drawings in which:

FIG. 1 is a perspective view of one embodiment of the invention, and

FIG. 2 is a top view of the electrode configuration shown in FIG. 1.

As shown in FIG. 1, insulating base 10 having a centrally located passage 12 therethrough is mounted on the open end of glass envelope 11. Extending through passage 12 and the closed end of envelope 11 are a plurality of glass covered electrical connectors 14 through 19. These connectors are distributed about the peripheral region of passage 12.

Mounted on connectors 15, 17 and 19 is a filamentary cathode comprising filaments 20 and arcuate end support 21. Source 22 is connected in series with shielded connectors 15 and 19 and supplies the heating current to the filaments. It has been found advantageous to use direct current heating and thus avoid the introduction of an alternating signal. Filaments 20 are selected to be thoria-coated iridium ribbons in order to obtain a substantially constant electron emission at vacuum pressures of $10^{-3}$ torr or less and to prevent oxidization of the filaments.

Accelerating grid 24 is affixed to supports 23 which in turn are mounted on shielded connectors 14 and 18 and comprises a helically wound conductor defining a substantially cylindrical grid volume. The grid is maintained at a positive potential with respect to the cathode by source 25 connected to shielded connector 14. Positioned within the cylindrical grid volume is a pair of ion collectors 26 supported on arcuate section 27 which in turn is mounted on shielded connector 16.

The ion collectors 26 are chosen to lie substantially in a diametral plane within the grid volume and are spaced from the axis thereof as shown in FIG. 2. The spacing of the collectors is such that the stream of evaporant material passes between the pair and therefore substantially no deposition of the evaporant material on the ion collectors occurs. The ion collectors are biased negatively relative to the accelerating grid by source 28.

During normal operation, the stream of evaporant material enters the open end of the ionization gauge as shown. The flow of current through filamentary cathodes 20 causes a substantially constant flow of electrons to be emitted therefrom. These electrons are accelerated by the potential gradient existing between the emitting filamentary cathodes 20 and the positively biased accelerating grid 24.

The accelerating grid is a helically wound conductor and the spaces between adjacent windings permit a large number of the emitted electrons to pass into the grid volume. These electrons have been accelerated to a high velocity and strike the molecules of evaporant material within the grid volume to thereby cause ionization of the material. In addition, the background gas will also be ionized.

The positive ions which are produced by ionization are attracted toward the negatively biased ion collectors. The collected ions cause a current to flow in the collector circuit. If the number of electrons passing through the grid is held constant, the number of ions produced in a given period is a function of the rate of flow of the evaporant material and the background pressure.

By periodically terminating or interrupting the flow of evaporant material, the current in the collector circuit is comprised of two components. One component will be a constant or D.C. current proportional to the constant background pressure, while the other component is an A.C. component proportional to the rate of flow of evaporant material and having a frequency determined by the rate at which the flow is interrupted.

The current produced by the collected ions develop a voltage across load resistor 29 which is fed to a filter 30, an amplifier 31, and a recorder 32. The filter 30 may be a conventional resistance-capacitance filter which passes the desired A.C. component. The A.C. component is amplified and may be shown on an oscilloscope or supplied to other recording means as desired.

By spacing the ion collectors just outside the stream of evaporant material, the deposition of evaporant material on the electrodes of the gauge has been eliminated. It has been found that in so doing, a pair of ion collectors results in a gauge having substantially the same sensitivity as those gauges employing a centrally located ion collector to measure the flow of conductive material. In addition, the present gauge may be utilized in monitoring the rate of flow of non-conductive material. Also, additional sensitivity may be attained by the use of more than two ion collectors placed in a circular path within said grid volume spaced from the stream of evaporant material.

In the present ionization gauge, the electrical connectors are shielded until they extend outwardly through the closed end of glass envelope 11. Thus, any leakage currents due to the depositing of evaporant material on either the envelope or the connectors are eliminated.

In one particular embodiment tested and operated at a vacuum pressure of $5 \times 10^{-5}$ torr with an electron emission current of 1 ma. and the accelerating grid at 150 v. positive and the collector at 180 v. negative, the D.C. current was found to be 0.5 $\mu a$ D.C. For an evaporation rate of 1 Angstrom per second of barium oxide, the A.C. component was observed to be 0.005 $\mu a$ A.C. The frequency with which the beam was interrupted was ten times per second. In addition, the present ionization gauge was found to have sufficient sensitivity to monitor a stream of lead oxide having a rate of flow of 10 Angstroms per second in an oxygen environment with a pressure of $10^{-2}$ torr. To determine the actual deposition on the particular substrate, the gauge may be calibrated initially by conventional film thickness methods.

While the above description has referred to a specific embodiment, it will be understood that many modifications may be made therein without departing from the spirit and scope of the invention.

What is claimed is:

1. An ionization gauge for monitoring the flow of evaporant material during vacuum deposition which comprises
   (a) an insulating base,
   (b) an accelerating grid mounted on said base, said grid defining a volume through which said evaporant material flows,
   (c) cathode means mounted on said base, said cathode means being positioned outside said grid volume, and
   (d) a plurality of ion collectors mounted at one end on said base, said ion collectors being positioned within said grid volume with the other ends thereof free, upstream of the flow and spaced from each other to permit the flow of evaporant material therebetween.

2. An ionization gauge for monitoring the flow of evaporant material during vacuum deposition which comprises
   (a) an insulating base,
   (b) a helically wound accelerating grid mounted on said base, said grid defining a substantially cylindrical volume through which the evaporant material flows having its central axis substantially perpendicular to said base,
   (c) a filamentary cathode mounted on said base, said cathode being positioned outside said grid volume, and
   (d) a plurality of ion collectors mounted at one end on said base, said ion collectors being positioned within said grid volume substantially parallel to the axis thereof with the other ends thereof free, upstream of the flow and spaced from each other and said axis to permit the flow of evaporant material therebetween.

3. An ionization gauge for monitoring the flow of evaporant material during vacuum deposition which comprises
   (a) an insulating base,
   (b) an accelerating grid mounted on said base, said grid being formed of a helically wound conductor and defining a substantially cylindrical volume having its central axis substantially perpendicular to said base,
   (c) a filamentary cathode mounted on said base, said cathode being positioned outside said grid volume, and
   (d) a pair of ion collectors mounted at one end on said base, said ion collectors being positioned in a diametral plane within said grid volume and spaced from the axis thereof, said collectors having the other ends thereof free, upstream of the flow and spaced from each other to permit the flow of evaporant material therebetween.

4. An ionization gauge for monitoring the flow of evaporant material during vacuum deposition which comprises
   (a) an insulating base having a centrally located passage therethrough,
   (b) a plurality of insulated supporting conductors extending through said passage,
   (c) an insulating envelope affixed to said base, said supporting conductors passing through and supported by said envelope,
   (d) an accelerating grid mounted on at least one of said supporting conductors, said grid being formed of a helically wound conductor and defining a substantially cylindrical volume having its central axis substantially coincident with the central axis of the base passage,
   (e) a filamentary cathode connected between a pair of said supporting conductors and residing outside said grid volume, and
   (f) a plurality of ion collectors connected to at least one of said supporting conductors, said ion collectors being mounted at one end on said base and being positioned within said grid volume with the other ends thereof free, upstream of the flow and spaced from each other and from the axis of said grid volume to permit the flow of evaporant material therebetween.

5. An ionization gauge for monitoring the flow of evaporant material during vacuum deposition which comprises
   (a) a cylindrical insulating base having a centrally located passage through one end with the other end of said base being closed,
   (b) a plurality of insulated supporting conductors extending through the closed end of said base and through said passage,
   (c) an accelerating grid mounted on one end of at least one of said supporting conductors, said grid being formed of a helically wound conductor and defining a substantially cylindrical volume having its axis substantially coincident with the axis of the base passage,
   (d) a filamentary cathode connected between a pair of other supporting conductors and having a length substantially equal to the height of said accelerating grid, said cathode being positioned outside said grid volume, and
   (e) a plurality of ion collectors connected at one end to at least a further one of said supporting conductors, said ion collectors residing within and having a length substantially equal to the height of said accelerating grid, said ion collectors being positioned within said grid volume with the other ends thereof free, upstream of the flow and spaced from the axis of said grid volume and from each other to permit the flow of evaporant material therebetween.

References Cited

UNITED STATES PATENTS 3,067,346  12/1962  Pennington _____ 313—7

FOREIGN PATENTS 669,631  4/1952  Great Britain.

DAVID J. GALVIN, *Primary Examiner.*